March 22, 1955     A. R. VOGEL     2,704,646
AUTOPILOT DISCONNECT
Filed March 26, 1951     2 Sheets-Sheet 1
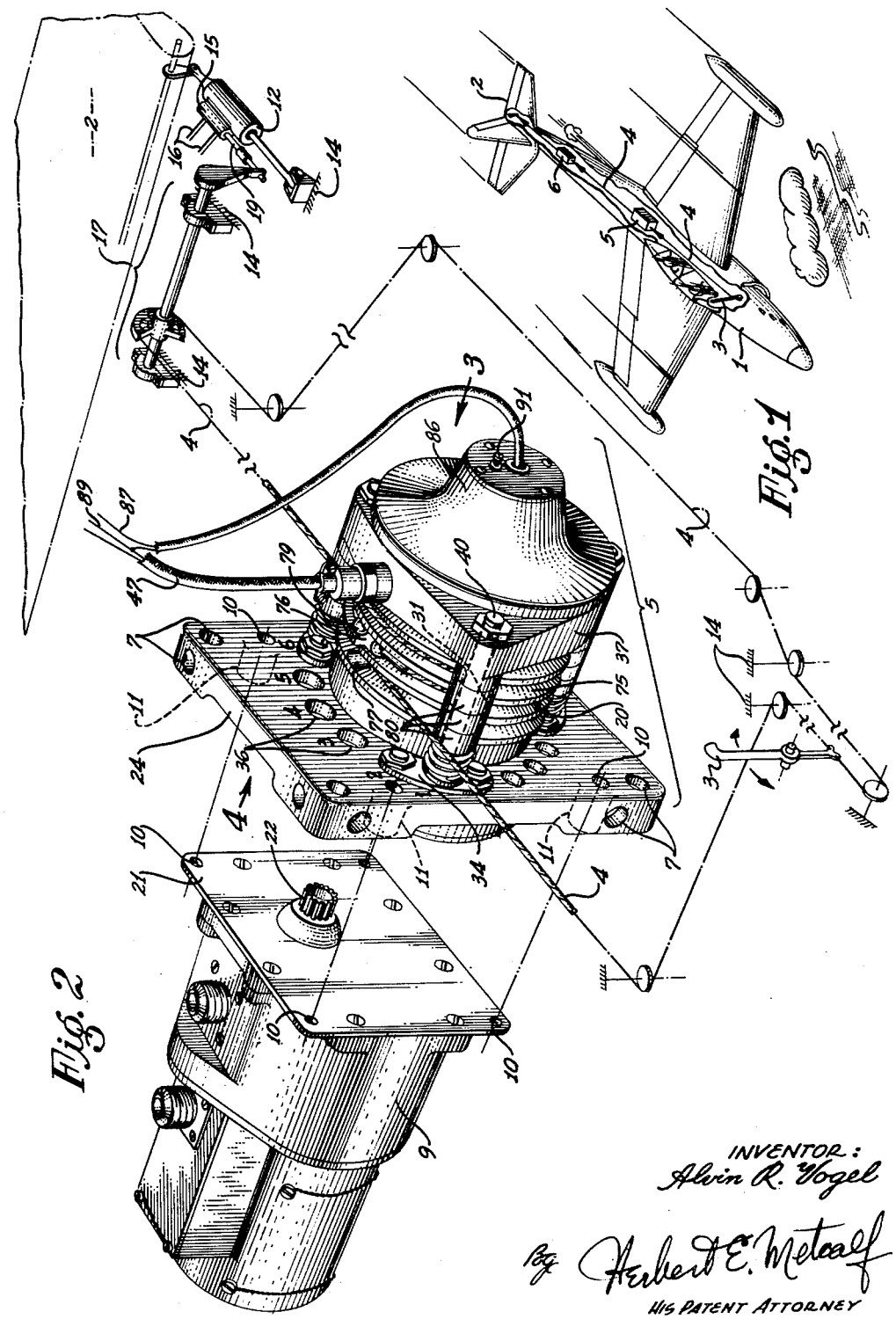
INVENTOR:
Alvin R. Vogel
By Herbert E. Metcalf
HIS PATENT ATTORNEY March 22, 1955  A. R. VOGEL  2,704,646
AUTOPILOT DISCONNECT
Filed March 26, 1951  2 Sheets-Sheet 2
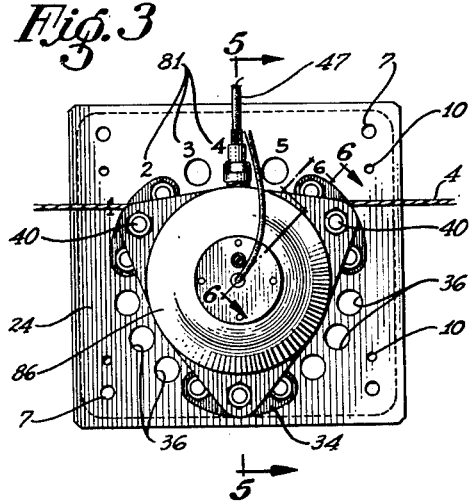
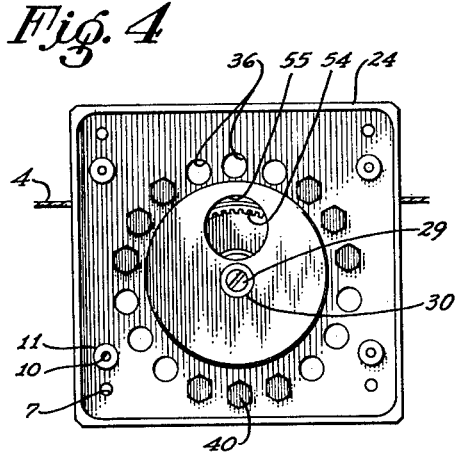
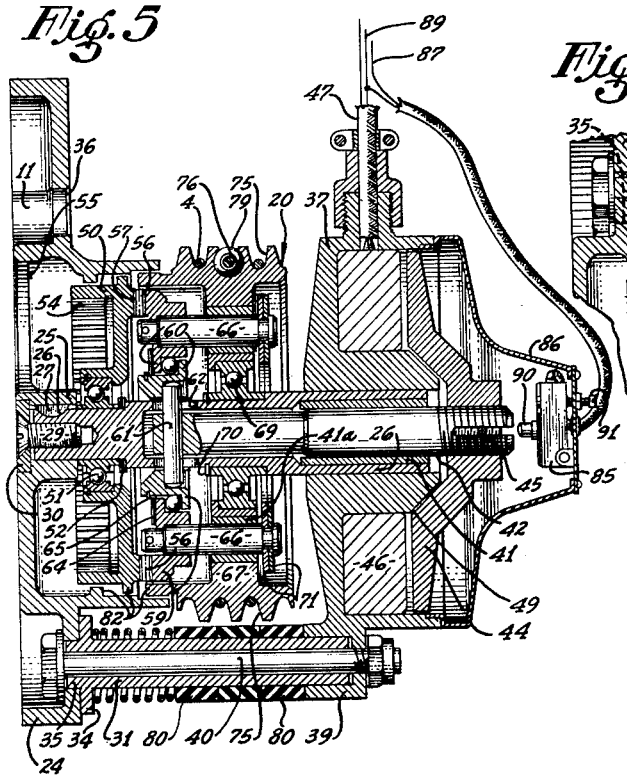
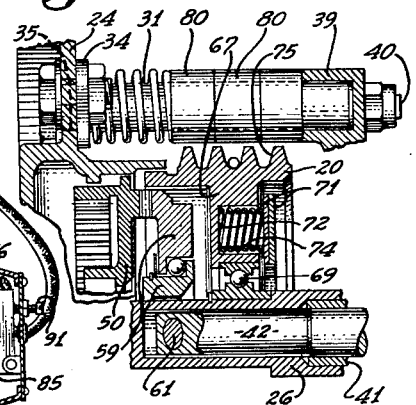
INVENTOR:
Alvin R. Vogel
By Hubert E. Metcalf
HIS PATENT ATTORNEY United States Patent Office 2,704,646
Patented Mar. 22, 1955

2,704,646

AUTOPILOT DISCONNECT

Alvin R. Vogel, Los Angeles, Calif., assignor to Northrop Aircraft, Inc., Hawthorne, Calif., a corporation of California Application March 26, 1951, Serial No. 217,476

8 Claims. (Cl. 244—75)

This invention relates to disconnect couplings or devices, and, more particularly, to an electrically operated disconnect mechanism suitable for use in aircraft as an automatic pilot servo actuator disconnect.

In airplanes having automatic piloting devices operating to move the various control surfaces in accordance with attitude and direction-responsive instruments, the autopilot servo actuators causing the control movements are connected to operate the normal surface control system which is also operated manually by the human pilot when the autopilot is not being used. When the autopilot is operatively connected, it follows that the pilot's manual controls are moved in synchronism with the servo actuators.

It is required that when the autopilot is not in control, the human pilot be able to manually fly the airplane without restriction from the autopilot servos. It is, therefore, the common practice to disengage in some manner the output of the servos from the normal control system when shutting off the autopilot. It is also required, in case of malfunction or failure of the autopilot when it is impossible to disengage it, that means be provided enabling the pilot to overpower the autopilot to control the airplane manually as necessary. One way in which the latter has been accomplished is with a friction clutch assembly mounted between the servo actuator and the control system, the clutch having a specified limited driving torque so that it will slip and allow relative movement of its members when this torque value is exceeded.

Heretofore, the usual method of disengaging the autopilot has been merely to deenergize it or open a by-pass valve, or the like, thus allowing at least a portion of the servo actuator to be "free wheeled" during manual pilot control. This results in substantial frictional resistance to manual control. If a disengageable friction clutch is employed for this function, the above-mentioned frictional drag may vary when affected by accelerations imposed on the airplane, and the clutch plates are affected by any moisture, temperature changes, gear lubricant, and hydraulic oil drippings which may reach them. A clutch of this type, when also designed to be manually overpowered for emergency control, is subject to slippage or creepage when in the engaged, driving position, and requires readjustment after wear.

It is an object of the present invention to provide an automatic pilot servo disconnect unit which, when disconnected, is physically separated from all parts of the servo actuator output drive, thus reducing total frictional drag of the servo disconnect to a negligible amount.

Another object of this invention is to provide a servo disconnect unit which, when connected, gives a positive drive with zero slip and zero backlash, while still providing for breaking of the connection at a predetermined overpowering load.

A further object of the present invention is to provide a servo disconnect unit accomplishing the above functions and having no adjustments or service operations required after installation, nothing to be affected by moisture, temperature variations, or foreign matter, and no frictionally operative parts. It is another object to provide an electrically operated disconnect unit wherein the positions of the input and final output members are not altered in any direction differing from their normal control movement directions, when connected or disconnected.

Further objects are to provide such a unit which is small and light in weight, and requires no internal or "tricky" adjustments for proper operation.

Briefly, my invention comprises a releasing coupling of two coaxial, toothed, members engaging end to end, together with an output member rotatively connected to one toothed member but allowing relative axial movement between the output member and the toothed member, the said one toothed member being so movable from an external location by means of an electrical solenoid shaft, or other operating device, which slides within a main mounting axle for the rotating components, the other toothed member being adapted to be directly connected to a rotary driving member. The unit is preferably designed to be engaged when the solenoid is energized, and disengaged, by spring action, when the solenoid is deenergized. A solenoid shaft adjustment is provided externally of the unit so that the engaged position bottoms the coupling teeth at the proper position of the solenoid armature. The pressure angle of the coupling teeth is relatively high so that a correspondingly high separating force for a given driving torque is obtained, thus providing for emergency disengagement when overpowered by manual effort on the output member. When the unit is disengaged, the output member and connected toothed member are completely free from other parts, and rotate on an anti-friction bearing.

The present invention will be more fully understood by reference to the detailed description of specific apparatus, to follow, together with the accompanying drawings of the preferred embodiment.

In the drawings:

Figure 1 is an airplane showing the present invention as embodied in the elevator control system.

Figure 2 is a perspective diagrammatic view of the elevator control system of Figure 1, showing an autopilot servo actuator and the servo disconnect unit of the present invention connected in series with the elevator cable system.

Figure 3 is one end view of the servo disconnect, taken as indicated by the arrow 3 in Figure 2.

Figure 4 is the other end view of the servo disconnect, taken as indicated by the arrow 4 in Figure 2.

Figure 5 is a longitudinal section of the servo disconnect, taken through the vertical center plane as indicated by the line 5—5 in Figure 3.

Figure 6 is a partial sectional view of the disconnect, taken generally through a 45° plane as indicated by the line 6—6 in Figure 3.

Referring first to Figures 1 and 2 for a description of a particular apparatus employing the invention, an airplane 1 has an elevator surface 2, and control stick 3, with a control system comprising cables 4, autopilot servo disconnect 5, and elevator operating mechanism 6 connected between the stick 3 and the elevator 2. As shown in Figure 2, the servo disconnect 5 is adapted for mounting on the airplane structure by various mounting holes 7, and a servo actuator 9, energized from the automatic pilot (not shown), is attached to the disconnect unit 5 at four places by means of attachment holes 10 and bosses 11. Figure 2 shows the actuator 9 displaced from the disconnect unit 5 for clarity of illustration. The elevator operating mechanism 6 comprises a hydraulic actuating cylinder assembly 12 connected between the elevator 2 and aircraft structure 14, a servo valve 15 integral with the cylinder casing and supplied with hydraulic supply and return lines 16, and a mechanical linkage 17 between the cables 4 and a control rod 19 of the valve 15.

The particular form of operating mechanism 6 shown herein is not a part of the present invention, and any type or form of control may be used without affecting operation of the servo disconnect 5. Also, the servo disconnect 5, having a cable drum 20 to which the cables 4 are attached, is shown herein as being connected in series with the actual control cables 4 for example only. The servo disconnect 5 may obviously be connected to be rotated by the stick by separate cables of its own, without being connected directly to the same cables which lead to the elevator operating mechanism 6.

The servo actuator 9 has a mounting face 21 which fits flat against the disconnect unit 5 when bolted thereto, this face 21 being exactly perpendicular to its output shaft which carries a driver pinion 22. Since all standard actuators have similar mounting provisions, the servo disconnect 5 of the present invention can be designed to precisely fit the particular actuator with which it is to be used, and thus become a standard attachment itself.

Referring now to Figure 5 (in conjunction with Figures 2, 3 and 4), the servo disconnect 5 has a base casting 24 to which all other parts are directly or indirectly attached. An internal boss 25 on the base 24 supports one end of a main shaft 26 which is located and prevented from turning by a shaft key 27, and is axially positioned by an end screw 29 threaded into the shaft, with a countersunk washer 30 fitting behind the screw head. Three support posts 31 are erected from the base 24 at 120° spacings around the center line of the main shaft 26. The posts 31 each have a mounting flange 34 bolted to the base 24 on each side of the post, and a centering projection 35 which exactly fits any of a number of receiving holes 36 in the base 24. At the opposite ends of the posts 31, a solenoid frame 37 with three sockets 39 fits over the posts 31 and a center bolt 40 through each post and socket 39 holds the solenoid frame 37 solid with respect to the base 24.

The other end of the main shaft 26, after having two enlargements of diameter, is supported concentrically in the center of the solenoid frame 37. This end of the main shaft 26 is hollowed for the majority of its length to receive a self-lubricating plain bearing 41 through which slides an armature shaft 42 made of non-magnetic material. A solenoid armature 44 is threaded onto the armature shaft 42 and adjustably retained by a cotter pin 45. A solenoid coil 46, wound in the frame 37, has input wires 47 which, when energized, cause the solenoid to pull the armature 44 inwardly and close the air gap 49, thus moving the armature shaft to the left.

Starting now at the left end of the main shaft 26, a ring gear 50 is rotatably mounted on a ring gear ball bearing 51 which abuts the internal boss 25, and thin spacer rings 52 are located between the other side of the bearing 51 and a larger diameter portion of the main shaft 26. On the input side of the ring gear 50, internal spur teeth 54 are formed to engage with the actuator driver pinion 22 which extends through an entrance hole 55 in the base 24. The actuator 9 is thus connected to rotate the ring gear 50 at all times on the standard radial ball bearing 51.

Radial coupling teeth 56 are ground into the periphery of a ring gear flange 57 facing to the right from the ring gear. These teeth 56 have a constant depth and a relatively high pressure angle (about 20° or more). They are preferably produced by a "generating" method such as used for Gleason "Curvic" couplings, for example, so that accuracy and maximum load capacity are obtained together with a fast rate of production. The mating coupling teeth are similarly formed in the flange of a ball thrust bearing assembly 59. The coupling teeth, when engaged, have a slight clearance, as usual, at the bottoms of the teeth, and are straight along their sides from bottom to top so that there is no blacklash when the ring gear 50 and ball thrust bearing 59 are forced together for driving, in either direction. The tooth profiles are case hardened and have chamfered engaging surfaces.

The inner and outer races of the ball thrust bearing assembly 59 have integral shoulders 60 to resist thrust to the left on the inner race. This inner race has a receiving slot to contain a thrust pin 61 for the purpose of pushing the ball thrust bearing to the left to engage the coupling teeth 56. The thrust pin 61 projects through an elongated slot 62 in the main shaft 26 and a hole drilled through the inner end of the armature shaft 42, whereby the thrust pin is driven axially by solenoid action. This pin is prevented from falling out by its encompassment in the inner race of the thrust bearing 59. It will be noted that the inner race of the thrust bearing is an integral assembly retained as a single unit by a steel washer 64 and snap ring 65 on the non-thrust side of the inner race, and wherein maximum reliability is provided by the integral shoulders 60.

Four dowel pins 66 are pressed into equally spaced holes in the right side of the thrust bearing outer race and permanently retained by a cotter pin or the like. The opposite ends of the dowel pins 66 engage accurately with holes in a drum flange 67 of the cable drum 20, the latter holes being fitted with burnished self-lubricating bearings 41a to permit sliding of the dowels therethrough. This constrains the outer race of the thrust bearing 59 against relative rotation to the cable drum 20, while at the same time allows engagement and disengagement of the coupling teeth 56 without axial displacement of the cable drum 20.

Friction-free rotation of the cable drum 20 around the main shaft 26 is provided by a drum ball bearing 69 of the standard radial type similar to the ring gear ball bearing 51. The drum ball bearing location is determined at the inner race by a bearing retainer 70 on the left side and another larger diameter portion of the main shaft 26 on the right side.

The dowel pins 66 are connected at their right ends by two annular ring slotted plates 71 having oppositely directed keyhole slots (not shown), and the plates 71 are held from relative rotation by lockwire, for example, which locks them to the dowel pins. As shown in Figure 6, the drum flange 67 contains four recesses 72, spaced at alternate locations between the dowel pins 66, to house return springs 74 bearing against the drum flange 67 and the slotted plates 71. Thus it is seen that the dowel pins 66 are spring-loaded in the direction which causes the coupling teeth 56 to disengage.

In the cable drum 20, grooves 75 are provided in which to wrap and attach the control cables 4. A spherical ended submerged slot 76 is milled in one of the grooves 75 from an adjacent groove where an entrance bore 77 is provided for the insertion of ball type cable terminals 79. Thus the terminals will not fall out when the cables are slackened and no loose parts are required to attach the terminals. Also, for cable retention in the grooves when the cables are slackened, integral cable guards comprising spring-loaded phenolic spacers 80 are provided around the support posts 31. This guard means will not be described in detail herein, since it is fully shown, described and claimed in a copending application, Serial No. 217,475, filed March 26, 1951, issued as U. S. Patent No. 2,644,667 on July 7, 1953.

By means of the several receiving holes 36 in the base 24, the solenoid frame 37 and support posts 31 which form cable guards may be installed in several positions of revolution onto the base, as indicated by index numbers 81 on the base. In this manner, any position can be selected to accommodate the direction of cable take-off for any particular control system cable routing.

The coupling teeth 56 and spur teeth 54 of the disconnect unit 5 are protected against the entrance of dirt, water and other foreign matter by a series of channels and ridges 82 on the base 24, and on the exterior of the ring gear 50 and the cable drum 20, as shown in Figure 5.

During assembly of the disconnect unit 5, the number of spacer rings 52 is installed which will correctly locate the disengaged position of the ball thrust bearing 59 carrying half of the toothed coupling, since the right end of the elongated slot 62 in the main shaft 26 is the part which determines this disengaged position. In other words, when the solenoid coil 46 is deenergized and the return springs 74 operate, the thrust pin 61 is displaced until stopped by the main shaft 26, the latter taking the shock of the sudden stop and transmitting it directly to the base 24 through the shaft end screw 29.

The only adjustment after assembly of the unit is the armature 44 on the armature shaft 42. This consists of turning the armature 44 on the armature shaft until the armature bottoms on the frame 37, with the coupling teeth 56 solidly engaged and solenoid deenergized, and then backing off the armature about one-half turn. This is to insure that the coupling teeth solidly engage during operation and that the air gap 49 is as small as possible to get maximum solenoid force. No further adjustment, service, or lubrication is necessary.

Because of the "centerfits" employed at the ends of the support posts 31 and the shaft boss 25 in the base 24, perfect alignment of the ring gear 50 and driver pinion 22 is insured. When the unit is disengaged, the cable drum 20 is free to rotate on the drum ball bearing 69, physically frictionless and drag-free. Of course, there is no slip or creepage when the coupling is connected and is driving torque loads up to the minimum design capacity (which is 250 pound-inches in one embodiment), and any shock loads imposed in starting when the unit is energized are absorbed by the cables 4 which are elastic to a certain extent.

The torque load mentioned above to overpower and separate the coupling teeth when the solenoid is energized, is determined by various factors such as solenoid force, return spring force, and coupling tooth pressure angle, to meet the requirement of emergency manual operation discussed previously. After completion and installation of the unit, the torque load capacity can be modified by connecting a resistor in series with the solenoid coil 46, or varying the coil current in some similar manner.

The output member in this embodiment is the cable drum 20, but the disconnect unit 5 is not limited to use only with a cable, since any other type of output drive member may be incorporated. In addition, it may be desirable in some instances to reverse the direction of energization of the unit; that is, the coupling teeth may be engaged when the solenoid is deenergized and disengaged when energized. This may be accomplished by means well known in the art, such as interchanging the positions of the toothed flanges on the ring gear and outer race of the ball thrust bearing, or reversing the directions of solenoid shaft pull, when energized, and return spring action.

While the present embodiment has been described in an elevator surface control system, it is obvious that one of the disconnects can be employed in each of the several airplane control systems wherever an automatic pilot or other control device is to be operatively connected and disconnected. Further, this invention is capable of use in applications outside the aircraft industry where a similar electro-mechanical disconnect is desired. In fact, the armature shaft 42 may be operated by devices other than an electrical solenoid, and still retain the low-friction, efficient disconnect principles, together with the emergency overpowering provisions. The present device can be engaged or disengaged while under load and/or during relative rotation of the mating parts, due to its very fast action.

Another feature of the present invention, which may be incorporated if desired, and which is shown in Figures 2 and 5, is a lock-out switch 85 attached to a dust cover 86 over the solenoid frame 37. The lock-out switch 85 is wired normally closed, and connected in series with the solenoid coil 46 and a normal input wire 87. An override input wire 89 is connected between the solenoid coil and the switch. When the armature shaft 42 is in the "engaged" position, as shown, the solenoid coil 46 is kept energized through the non-actuated lock-out switch 85, but when the armature shaft 42 is thrown to the right in case the emergency overpowering operation as described previously is necessary, the lock-out switch 85 is actuated by means of direct shaft contact with a switch plunger 90, and the solenoid coil 46 is deenergized. This will keep the disconnect unit disengaged unless the lock-out switch is by-passed by energizing the override input wire 89. The electrical input circuits to the solenoid coil and switch may be connected to function in a variety of ways, as desired. With this feature, an adjustment screw 91 is provided to set the switch operating position relative to the armature shaft 42.

For normal operation, however, in the absence of the lock-out switch 85, a pilot's switch and a power source (not shown) are merely connected in series with the solenoid coil 46 by means of the input wires 47.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. A disconnect coupling unit comprising a mounting base having a first shaft end support, an end frame parallel to and supported from said base at a distance therefrom by three support posts circumferentially surrounding the mechanism of said coupling unit and having a second shaft end support in line with the first, a stationary mounting shaft held in said shaft end supports, a driving member rotatable about said shaft between said end supports, an output driven member rotatable directly about said shaft independently of and coaxial with said driving member and located between said end supports, a primary driven member rotatively and coaxially attached to said output driven member between the latter and said driving member, radial mating coupling teeth on adjacent ends of said driving and primary driven members, said primary driven member being movable axially with respect to said output driven member into and out of an engaged position where said teeth give said primary driven member a positive two-way driven connection with said driving member, said shaft having a hollow portion and a longitudinally slotted opening through said shaft intersecting said hollow portion adjacent said primary driven member, an actuator rod slidable in said hollow portion and extending externally through the center of one of said shaft end supports, a thrust element secured to the inner end of said actuator rod and extending radially outward through said slotted opening, a ball thrust bearing having ball races positioned normal to the direction of thrust and forming a part of said primary driven member surrounding said shaft and adapted to receive the outer portion of said thrust element so that axial movement of said actuator rod in one direction transmits a thrust to said primary driven member to normally hold it solidly in said engaged position with no backlash between said driving and primary driven members, and elastic means connected between said driven members to move said primary driven member out of said engaged position in the absence of said thrust.

2. A disconnect coupling unit comprising a mounting base having a first shaft end support, an end frame parallel to and supported from said base at a distance therefrom and having a second shaft end support in line with the first, a stationary mounting shaft held in said shaft end supports, a driving member rotatable about said shaft between said end supports, an output driven member rotatable directly about said shaft independently of and coaxial with said driving member and located between said end supports, a primary driven member rotatively and coaxially attached to said output driven member between the latter and said driving member, radial mating coupling teeth on adjacent ends of said driving and primary driven members, said primary driven member being movable axially with respect to said output driven member into and out of an engaged position where said teeth give said primary driven member a positive two-way driven connection with said driving member, said shaft having a hollow portion and a longitudinally slotted opening through said shaft intersecting said hollow portion adjacent said primary driven member, an actuator rod slidable in said hollow portion and extending externally through the center of one of said shaft end supports, a thrust element secured to the inner end of said actuator rod and extending radially outward through said slotted opening, a ball thrust bearing having ball races positioned normal to the direction of thrust and forming a part of said primary driven member surrounding said shaft and adapted to receive the outer portion of said thrust element so that axial movement of said actuator rod in one direction transmits a thrust to said primary driven member to normally hold it solidly in said engaged position with no back-lash between said driving and primary driven members, elastic means connected between said driven member to move said primary driven member out of said engaged position in the absence of said thrust, a coupling actuator mounted on said one shaft end support, and adjustably connected to said actuator rod, said actuator arranged to hold said primary driven member in said engaged position with a certain actuator force, when energized in an engaging direction, said coupling teeth having a relatively high pressure angle to provide a disengaging force when said coupling unit is transmitting a torque load, the various forces being proportioned to determine a desired torque-transmitting capacity of said coupling unit at which said primary driven member will be forced out of said engaged position while said actuator is so energized.

3. In an airplane having a surface control system and an automatic pilot servo actuator for moving a control surface in addition to human control when desired, an improved servo disconnect for selectively connecting said servo actuator to said surface control system, which comprises a stationary mounting axle, a driving member rotatable about said axle, an output driven member rotatable about said axle independently of and coaxial with said driving member, a primary driven member rotatively and coaxially attached to said output driven member and movable axially relative to said output driven member into and out of an engaged position where said primary driven member has a positive rotative connection with said driving member in both directions, said driven members being entirely physically separated from said driving member and all driving forces when not in said engaged position, externally accessible control means connected to said primary driven member for effecting axial movement of said primary driven member, said output driven member adapted to be operatively connected to said surface control system, said driving member adapted to have a fixed driven connection with said servo actuator, said driving member and said primary driven member being provided with radial mating coupling teeth on adjacent ends thereof for obtaining said engaged position, said coupling teeth having a relatively high pressure angle to provide a separating force increasing with the torque load carried by said teeth when engaged, said axle having a hollow portion from one end thereof to a point near said primary driven member, and said axle having a longitudinally slotted opening therethrough intersecting said hollow portion adjacent said primary driven member, said control means comprising an actuator shaft slidable in said hollow portion, a connecting element secured to the inner end of said shaft and extending through said slotted opening, rotary thrust bearing means connected between said connecting element and said primary driven member surrounding said axle, and control actuator means connected to the outer end of said actuator shaft adapted to engage said primary driven member and hold it engaged with a certain actuator force, when operated, said separating force and said actuator force being so designed as to give a predetermined torque-transmitting capacity of said disconnect unit at which said primary driven member will be forced out of said engaged position against said actuator force.

4. In an airplane having a surface control system and an automatic pilot servo actuator for moving a control surface in addition to human control when desired, an improved servo disconnect for selectively connecting said servo actuator to said surface control system, which comprises a stationary mounting axle, a driving member rotatable about said axle, an output driven member rotatable about said axle independently of and coaxial with said driving member, a primary driven member rotatively and coaxially attached to said output driven member and movable axially relative to said output driven member into and out of an engaged position where said primary driven member has a positive rotative connection with said driving member in both directions, said driven members being entirely physically separated from said driving member and all driving forces when not in said engaged position, externally accessible control means connected to said primary driven member for effecting axial movement of said primary driven member, said output driven member adapted to be operatively connected to said surface control system, said driving member adapted to have a fixed driven connection with said servo actuator, said driving member and said primary driven member being provided with radial mating coupling teeth on adjacent ends thereof for obtaining said engaged position, said coupling teeth having a relatively high pressure angle to provide an axial separating force increasing with the torque load carried by said teeth when engaged, and wherein said control means comprises a solenoid coil and armature assembly arranged to hold said primary driven member in said engaged position with a certain solenoid force when said coil is electrically energized, elastic return force means for disengaging said primary driven member when said coil is deenergized, said separating force, solenoid force, and elastic return force being designed to give a predetermined torque-transmitting capacity of said disconnect unit at which said primary driven member will be forced out of said engaged position while said coil is energized, and including a cut-out switch mounted on said disconnect unit and having a switch operator, said switch being closed when said disconnect unit is engaged, said operator arranged to be mechanically operated to open said switch when said disconnect unit is disengaged, whereby disengagement of said primary driven member by exceeding said torque-transmitting capacity can automatically deenergize said coil to keep said disconnect unit disengaged.

5. In an airplane having a surface control system and an automatic pilot servo actuator for moving a control surface in addition to human control when desired, an improved servo disconnect for selectively connecting said servo actuator to said surface control system, which comprises a stationary mounting axle, a driving member rotatable about said axle, an output driven member rotatable about said axle independently of and coaxial with said driving member, a primary driven member rotatively and coaxially attached to said output driven member and movable axially relative to said output driven member into and out of an engaged position where said primary driven member has a positive rotative connection with said driving member in both directions, said driven members being entirely physically separated from said driving member and all driving forces when not in said engaged position, externally accessible control means connected to said primary driven member for effecting axial movement of said primary driven member, said output driven member adapted to be operatively connected to said surface control system, said driving member adapted to have a fixed driven connection with said servo actuator, a mounting base having a first axle end support, an end frame supported from said base at a distance therefrom and having a second axle end support, said three members mounted about said axle between said end supports, said axle having a hollow portion and a slotted opening through said axle intersecting said hollow portion adjacent said primary driven member, said control means including an actuator rod slidable in said hollow portion and having a thrust connection with said primary driven member through said slotted opening to normally hold said primary driven member solidly in said engaged position with no backlash in a rotary direction, the outer end of said actuator rod extending through the center of said second axle end support, and wherein said output driven member and said base have drum-like circumferential surfaces comprising protective surroundings for said primary driven member and the moving parts within said disconnect unit, and including a control actuator mounted on said end frame and adjustably connected to said actuator rod outer end whereby said engaged position can be readily adjusted after assembly of said disconnect unit.

6. An autopilot servo disconnect coupling comprising a stationary mounting axle, a driving member and an output driven member each being independently, coaxially, and directly rotatable on said axle, a primary driven member positioned between said other two members, said primary driven member being rotatively and coaxially attached to said output driven member and movable axially with respect to said output driven member into and out of an engaged position where said primary driven member has a positive rotative driven connection with said driving member in either direction, said driving member and said primary driven member having radial mating coupling teeth on adjacent ends thereof for obtaining said engaged position, said coupling teeth having a relatively high pressure angle to provide a correspondingly high disengaging force varying in accordance with the torque load transmitted through said coupling when engaged, control means including an armature output element slidable within a hollow slotted portion of said axle and having a positive driving connection with said primary driven member, a solenoid armature adjustably secured to said output element, and a solenoid coil assembly concentric with and forming a support for the hollow end portion of said axle, whereby said primary driven member is held in said engaged position with a force depending on a certain solenoid force when said coil is electrically energized, and including elastic return force means for disengaging said primary driven member when said coil is deenergized, the several forces being designed to result in a predetermined torque-transmitting capacity of said coupling at which said primary driven member will be forced out of said engaged position while said coil is energized.

7. In an autopilot servo disconnect coupling, a driving member and an output driven member adapted to be selectively coupled together and decoupled, a stationary mounting axle about which said members are independently, directly, and coaxially rotatable, a primary driven member positioned between said other two members and also being rotatably mounted directly on said mounting axle, and being movable axially with respect to said output driven member into and out of an engaged position where said primary driven member has a positive rotative driven connection with said driving member in both directions, said driven members being entirely physically separated from said driving member and all driving forces when not in said engaged position, radial mating coupling teeth on adjacent ends of said driving and primary driven members for obtaining said engaged position, said coupling teeth having flat, blunt tops and a relatively high pressure angle to provide a disengaging force at a predetermined overload torque, said primary driven member being rotatively attached to said output driven member by means of a plurality of driving pins secured at one end thereof to said primary driven member and positioned parallel to said axle, the other ends of said pins slidably passing through close tolerance holes in said output driven member, annular means connecting said other ends of said pins together beyond said output driven member, a plurality of recesses in said output driven member positioned alternately between said holes and facing said annular connecting means, a compression spring in each recess bearing between said output driven member and said annular connecting means to normally move said primary driven member out of said engaged position, and externally accessible control means connected to said primary driven member for effecting axial movement thereof into said engaged position, said control means extending from a hollow portion of said axle through the center of said output driven member.

8. A disconnect coupling unit adapted to be driven by a toothed driver pinion, comprising: a mounting base having a first shaft end support, an end frame parallel to and supported from said base at a distance therefrom and having a second shaft end support in line with the first, a stationary mounting shaft held in said shaft end supports, a driving member rotatable about said shaft between said end supports, an output driven member rotatable directly about said shaft independently of and coaxial with said driving member and located between said end supports, a primary driven member rotatively and coaxially attached to said output driven member between the latter and said driving member, radial mating coupling teeth on adjacent ends of said driving and primary driven members, said primary driven member being movable axially with respect to said output driven member into and out of an engaged position where said teeth give said primary driven member a positive two-way driven connection with said driving member, said shaft having a hollow portion and a longitudinally slotted opening through said shaft intersecting said hollow portion adjacent said primary driven member, an actuator rod slidable in said hollow portion and extending externally through the center of one of said shaft end supports, a thrust element secured to the inner end of said actuator rod and extending radially outward through said slotted opening, a ball thrust bearing having ball races positioned normal to the direction of thrust and forming a part of said primary driven member surrounding said shaft and adapted to receive the outer portion of said thrust element so that axial movement of said actuator rod in one direction transmits a thrust to said primary driven member to normally hold it solidly in said engaged position with no backlash between said driving and primary driven members, elastic means connected between said driven members to move said primary driven member out of said engaged position in the absence of said thrust, said actuator rod extending through said second shaft end support, said driving member having an internal ring gear on the side opposite said primary driven member, said base being closed around the ring gear end of said driving member except for a small round opening to receive said driver pinion for engagement with said internal ring gear, said output driven member and said base having drum-like outer surfaces comprising protective surroundings for said coupling teeth, ring gear and pinion teeth, and ball thrust bearing, whereby foreign matter is greatly hindered from reaching therein.

References Cited in the file of this patent

UNITED STATES PATENTS

| | | |
|---|---|---|
| 1,179,911 | Griffing | Apr. 18, 1916 |
| 1,475,869 | Petrie | Nov. 27, 1923 |
| 2,052,152 | Webb | Aug. 25, 1936 |
| 2,068,260 | Biggert, Jr. | Jan. 19, 1937 |
| 2,208,549 | Plensler | July 16, 1940 |
| 2,211,191 | Wolfram | Aug. 13, 1940 |
| 2,271,252 | Cardwell et al. | Jan. 27, 1942 |
| 2,377,575 | Ringer | June 5, 1945 |
| 2,382,765 | Zahodiakin | Aug. 14, 1945 |
| 2,398,421 | Frische et al. | Apr. 16, 1946 |
| 2,420,553 | Morrill | May 13, 1947 |
| 2,437,256 | Holt | Mar. 9, 1948 |
| 2,516,796 | Noxon | July 25, 1950 |
| 2,535,046 | Curry, Jr. | Dec. 26, 1950 |

FOREIGN PATENTS

| | | |
|---|---|---|
| 644,179 | Great Britain | Oct. 4, 1950 |